United States Patent
Tezuka

(10) Patent No.: US 10,345,778 B2
(45) Date of Patent: Jul. 9, 2019

(54) WAVEFORM DISPLAY DEVICE THAT PERFORMS AUTOMATIC EXTRACTION

(71) Applicant: FANUC CORPORATION, Yamanashi (JP)

(72) Inventor: Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 240 days.

(21) Appl. No.: 15/461,949

(22) Filed: Mar. 17, 2017

(65) Prior Publication Data

US 2017/0285600 A1  Oct. 5, 2017

(30) Foreign Application Priority Data

Mar. 30, 2016  (JP) ................. 2016-069022

(51) Int. Cl.
- G08B 23/00 (2006.01)
- G05B 19/042 (2006.01)
- G05B 19/408 (2006.01)
- G05B 19/4068 (2006.01)

(52) U.S. Cl.
CPC ....... *G05B 19/0426* (2013.01); *G05B 19/408* (2013.01); *G05B 19/4068* (2013.01); *G05B 2219/36177* (2013.01); *G05B 2219/40558* (2013.01)

(58) Field of Classification Search
CPC ............ G05B 19/0426; G05B 19/4068; G05B 19/4008; G05B 2219/31472; G05B 2219/40558
USPC .......... 340/500, 525, 657, 658, 691.1, 691.6
See application file for complete search history.

(56) References Cited

U.S. PATENT DOCUMENTS

| 2007/0068910 A1 | 3/2007 | Ikeda et al. |
| 2014/0244024 A1 | 8/2014 | Tezuka |
| 2016/0299488 A1* | 10/2016 | Ogawa ............... G05B 19/4065 |

FOREIGN PATENT DOCUMENTS

| DE | 10 2014 002 477 | 8/2014 |
| DE | 10 2014 012 868 | 3/2015 |
| JP | 2002-304207 | 10/2002 |
| JP | 2014-164597 | 9/2014 |
| JP | 2015-52846 | 3/2015 |

OTHER PUBLICATIONS

Notification of Reasons for Refusal dated May 29, 2018 in Japanese Patent Application No. 2016-069022.
Office Action dated Feb. 27, 2019 in German Application No. 102017205207.4.

* cited by examiner

*Primary Examiner* — Toan N Pham
(74) *Attorney, Agent, or Firm* — Wenderoth, Lind & Ponack, L.L.P.

(57) ABSTRACT

A waveform display device is provided that extracts data of a required portion from data outputted from a numerical control. A waveform display device includes: a data acquisition part that acquires a predetermined type of data from output data outputted from a numerical control; a condition determination part that determines a start condition and end condition for extracting partial data from the predetermined type of data based on information from the numerical control; a data extraction part that extracts the partial data corresponding to the start condition and end condition from the predetermined type of data; and a waveform display part that displays the partial data extracted as a waveform.

5 Claims, 3 Drawing Sheets

WAVEFORM DISPLAY DEVICE THAT PERFORMS AUTOMATIC EXTRACTION

This application is based on and claims the benefit of priority from Japanese Patent Application No. 2016-069022, filed on 30 Mar. 2016, the content of which is incorporated herein by reference.

BACKGROUND OF THE INVENTION

Field of the Invention

The present invention relates to a waveform display device that performs auto-extraction of data.

Related Art

Conventionally, in order to manage the operating condition of a machine tool, numerical control, etc., technology has been known for analyzing the state of a machine tool upon a machine tool, numerical control, etc. operating. For example, Patent Document 1 discloses the matter of adding up the power consumption amount for every processing cycle of the machine tool, and managing the operating condition of the machine tool based on the power consumption amount.

Patent Document 1: Japanese Unexamined Patent Application, Publication No. 2002-304207

SUMMARY OF THE INVENTION

However, with Patent Document 1, the operating condition is only managed based on the power consumption amount, and does not manage other states of a machine tool, numerical control, etc. In addition, in order to analyze data outputted from a machine tool, numerical control, etc., it has not been possible to optionally extract data of necessary portions.

Therefore, the present invention has an object of providing a waveform display device that can extract data of necessary portions from the data outputted from a numerical control.

A waveform display device (e.g., the waveform display device 1 described later) according to the present invention includes: a data acquisition part (e.g., the data acquisition part 11 described later) that acquires a predetermined type of data from output data outputted from a numerical control (e.g., the numerical control 2 described later); a condition determination part (e.g., the condition determination part 13 described later) that determines a start condition and an end condition for extracting partial data from the predetermined type of data based on information from the numerical control; a data extraction part (e.g., the data extraction part 14 described later) that extracts the partial data corresponding to the start condition and end condition from the predetermined type of data; and a waveform display part (e.g., the waveform display part 16 described later) that displays the partial data thus extracted as a waveform.

The condition determination part may determine the start condition and the end condition, based on input information from external equipment and information from the numerical control (2).

The input information may be a time set in advance, and the condition determination part may determine the start condition and the end condition based on the time set in advance and the information from the numerical control.

The condition determination part may determine an elapse of a fixed time period since the start condition being established as the end condition.

The condition determination part may determine the start condition and the end condition based on at least one among a program number of a processing program outputted from the numerical control, line number of a program, position command and operating state of the numerical control, as the information from the numerical control.

According to the present invention, it is possible to extract data of necessary portions from data outputted from a numerical control.

DETAILED DESCRIPTION OF THE INVENTION

Figure 1:
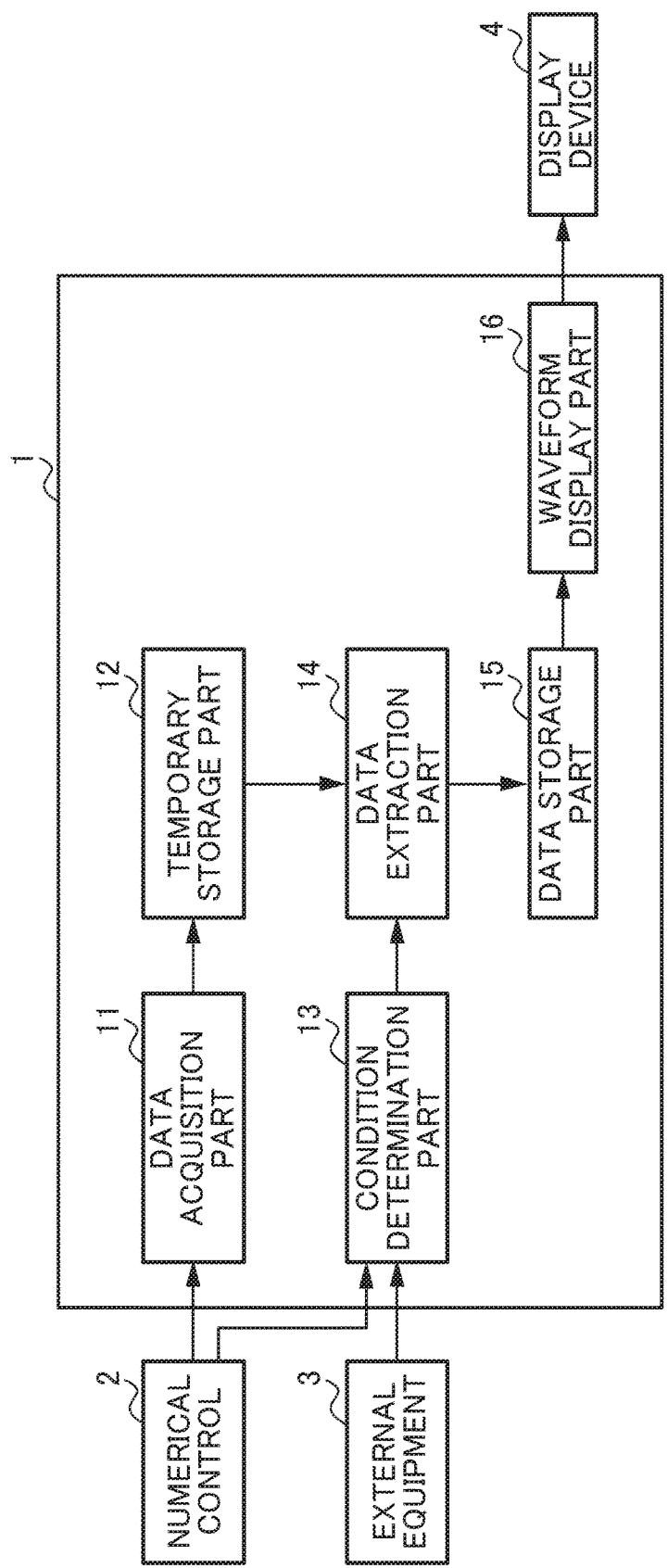
FIG. 1 is a block diagram showing the functional configuration of a waveform display device according to an embodiment of the present invention.

Hereinafter, an example of an embodiment of the present invention will be explained. FIG. 1 is a block diagram showing the functional configuration of a waveform display device 1 according to the present embodiment. The waveform display device 1 is an information processing device (computer) including a control unit (e.g., CPU), performing predetermined processing based on a processing program, information, etc., outputted from a computer numerical control (CNC) 2 and external equipment 3, and displaying the waveform.

The waveform display device 1 includes a data acquisition part 11, temporary storage part 12, condition determination part 13, data extraction part 14, data storage part 15, and waveform display part 16. Herein, the data acquisition part 11, condition determination part 13, data extraction part 14 and waveform display part 16 are realized by the control unit running predetermined software (program) stored in the waveform display device 1. In addition, the temporary storage part 12 and data storage part 15 are configured by storage devices such as internal memory, non-volatile memory and hard disks.

The data acquisition part 11 acquires a predetermined type of data from the output data outputted from the computer numerical control 2. The data acquisition part 11 stores the acquired predetermined type of data in the temporary storage part 12. Herein, the output data outputted from the numeric control 2 is data included in the processing program outputted from the numeric control 2, for example. The predetermined type of data is set in advance, and can include the program number, program line number, position command of the processing program, condition of the computer numeric control 2, etc., for example.

The temporary storage part 12 temporarily stores the predetermined type of data acquired by the data acquisition part 11. The temporary storage part 12 is configured by a ring buffer, for example. The ring buffer ensures a fixed amount of space, and if the data in the fixed amount of space becomes full, erases in order from oldest data, and overwrites new data.

The condition determination part 13 is connected to the numerical control 2 and external equipment 3, and determines the start condition and end condition for extracting partial data from the predetermined type of data stored in the temporary storage part 12, based on information from the numerical control 2 and external equipment 3.

More specifically, the condition determination part 13, for example, determines the event of a position command of the processing program starting as the start condition, at a specific program number and specific program line number of the processing program outputted from the numerical control 2. In addition, after starting the position command, the condition determination part 13 determines the event of the position command ending as the end condition, at a specific program number and specific program line number of the processing program outputted from the numerical control 2.

As another example, the condition determination part 13 may determine the start condition and end condition based on input information from the external equipment 3 and information from the numerical control 2. For example, the condition determination part 13 determines the start condition and end condition based on the start time and end time set in advance, as the input information from the external equipment 3. In this case, the external equipment 3 is a timer, computer including a timer, or the like, for example.

In addition, instead of the aforementioned end condition, the condition determination part 13 may determine the elapse of a fixed time period since the start condition being established as the end condition, based on the input information from the external equipment 3.

Furthermore, the condition determination part 13 may determine the start condition and end condition based on at least one of the program number of the processing program outputted from the numerical control 2, line number of the program, position command of the processing program and operating state of the numerical control 2, as the information from the numerical control 2.

For example, the condition determination part 13 may determine a condition combining any among the program number of the processing program, line number of the program, position command of the processing program and operating state of the numerical control (CNC) 2 (for example, program number and operating state of the numerical control 2), as the start condition and end condition.

The data extraction part 14 extracts, from the predetermined type of data stored in the temporary storage part 12, partial data corresponding to the start condition and end condition determined by the condition determination unit 13. Then, the data extraction part 14 stores the extracted partial data in the data storage part 15.

The data storage part 15 stores the partial data extracted by the data extraction part 14 to be associated with time. The waveform display part 16 displays the partial data stored in the data storage part 15 by the data extraction part 14 on the display device 4 as a waveform. More specifically, the waveform display part 16 associates the partial data with time, and displays on the display device 4 as a waveform. In other words, the waveform display part 16 unifies the partial data and displays on the display device 4. The display device 4 is a liquid crystal display, organic EL display, etc., for example.

Figure 2:
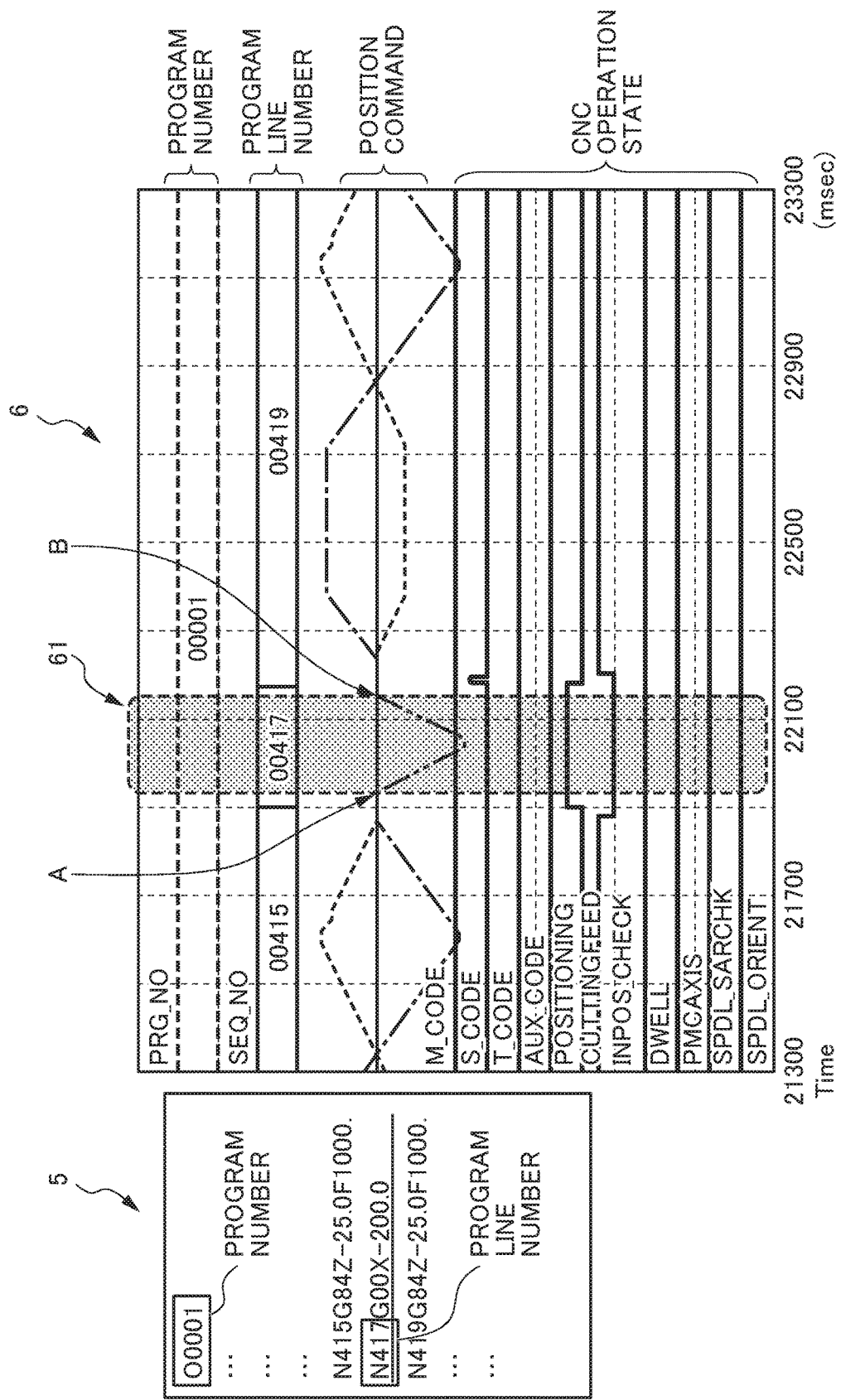
FIG. 2 is a view showing a specific example of a processing program and a waveform display according to the embodiment of the present invention.

FIG. 2 is a view showing a specific example of the processing program 5 and waveform display 6 according to the embodiment of the present invention. The processing program 5 is an example of a processing program outputted from the numerical control 2. The waveform display 6 is an example of a waveform displayed by the waveform display part 16. It should be noted that, although data other than the partial data 61 is illustrated as the waveform display 6 for convenience of explanation in FIG. 2, in practice, only the partial data 61 is extracted and displayed on the display device 4.

In the example of FIG. 2, the condition determination part 13 determines the event of the position command of the processing program 5 starting in program number "O0001" and program line number "N417" of the processing program 5 outputted from the numerical control 2 as the start condition (starting point A of the waveform display 6).

In addition, the condition determination part 13 determines the event of the position command of the processing program 5 ending in program number "O0001" and program line number "N417" of the processing program 5 outputted from the numerical control 2 as the end condition (end point B of the waveform display 6).

Then, the data extraction part 14 extracts the partial data 61 (shaded part in FIG. 2) corresponding from the start condition (start point A of the waveform display 6) to the end condition (end point B of the waveform display 6), from the predetermined type of data (program number, program line number, position command, and operating state of numerical control (CNC) 2).

The waveform display part 16 displays the extracted partial data 61 on the display device 4 as a waveform. In other words, the waveform display part 16 displays, on the display device 4, a graph in which the horizontal axis is time, and the vertical axis is the partial data 61 (program number, program line number, position command, and operating state of numerical control (CNC) 2).

In the example of FIG. 2, the partial data 61 extracted by the data extraction part 14 is constituted by the program number, program line number, position command, and operating state of the numerical control (CNC) 2.

In addition, the operating state of the numerical control 2 is constituted by M_CODE (auxiliary function during execution), S_CODE (spindle-speed function during execution), T_CODE (tool function during execution), AUX_CODE (auxiliary function during execution), POSITIONING (during positioning), CUTTINGFEED (during cutting feed), INPOS_CHECK (during in-position check), DWELL (during dwell), PMCAXIS (PMC axis during execution), SPDL_SARCHK (waiting for spindle speed reached signal), and SPDL_ORIENT (during spindle orientation).

However, the above-mentioned partial data 61 and operating state of the numerical control 2 are examples, and the present invention is not to be limited to these items. In addition, the waveform display device 1 can also use other data outputted from the numerical control 2 as the partial data 61 and operating state of the numerical control 2.

Figure 3:
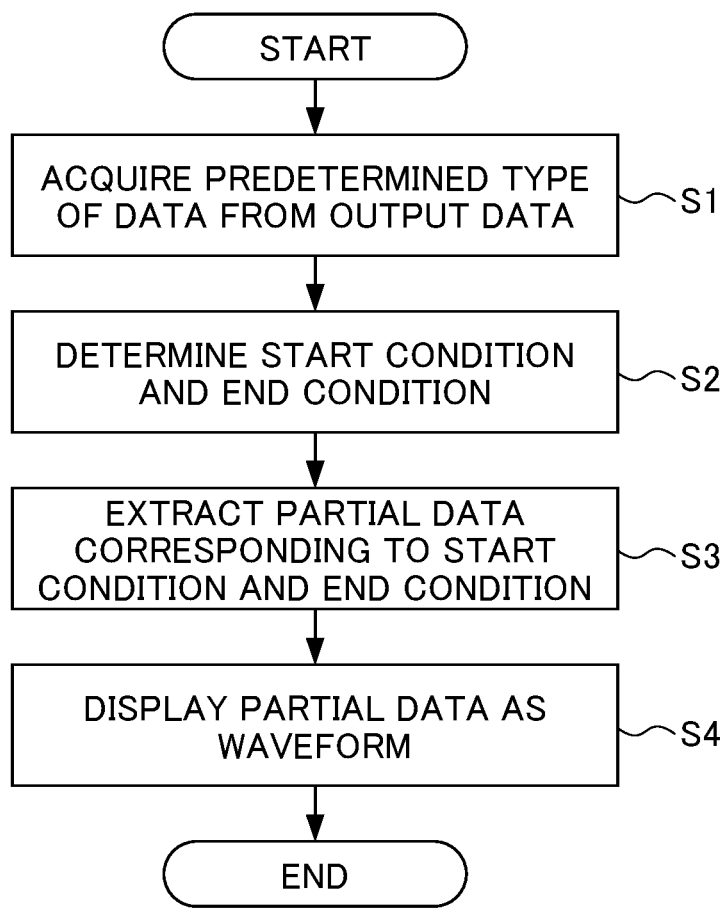
FIG. 3 is a flowchart showing the flow of processing of the waveform display device according to the embodiment of the present invention.

FIG. 3 is a flowchart showing the flow of processing of the waveform display device 1 according to the embodiment of the present invention. In Step S1, the data acquisition part 11 acquires the predetermined type of data from the output data outputted from the numerical control 2. The data acquisition part 11 stores the predetermined type of data thus acquired in the temporary storage part 12. In other words, the data acquisition part 11 stores the entirety of the predetermined type of data contained in the processing program outputted from the numerical control 2 in the temporary storage part 12.

In Step S2, the condition determination part 13 determines the start condition and end condition for extracting data from the predetermined type of data stored in the temporary storage part 12, based on the information from the numerical control 2 and external equipment 3.

In Step S3, the data extraction part 14 extracts the partial data corresponding to the start condition and end condition determined by the condition determination part 13, from the predetermined type of data stored in the temporary storage part 12. Then, the data extraction part 14 stores the extracted partial data in the data storage part 15. In other words, the data extraction part 14 automatically extracts only the data of the required portion for the user, from the predetermined type of data stored in the temporary storage part 12, and stores in the data storage part 15.

In Step S4, the waveform display part 16 displays the partial data stored in the data storage part 15 by the data extraction part 14 on the display device 4 as a waveform. By displaying the extracted data as a waveform, the user can easily understand the state of the extracted data.

According to the present embodiment, the waveform display device 1 determines the start condition and end condition for extracting the partial data from the output data outputted from the numerical control 2, and extracts the partial data corresponding to the start condition and end condition from the output data. It is thereby possible for the waveform display device 1 to economize the area for data storage in order to store data, compared to a case of storing all of the output data. In addition, the waveform display device 1 can accurately collect data of a required portion for automatically extracting partial data corresponding to the start condition and end condition from the output data. Consequently, it is possible to perform high-precision analysis upon analyzing using a large volume of output data, for example.

In addition, the waveform display device 1 determines the start condition and end condition using input information from the external equipment 3, along with information from the numerical control 2. The waveform display device 1 can thereby more accurately collect data of a required portion.

In addition, the waveform display device 1 determines the start condition and end condition using a time set in advance, along with information from the numerical control 2. The waveform display device 1 can thereby more accurately collect data of a required portion in the set time.

In addition, the waveform display device 1 determines after an elapsed of a fixed time period since the start condition is established as the end condition. The waveform display device 1 can thereby more accurately collect data of a required portion with a fixed time period.

In addition, the waveform display device 1 can more accurately collect data of a required portion outputted from the numerical control 2, by determining the start condition and end condition using at least one among the program number of the processing program, program line number, position command, and operating state of the numerical control 2.

Although an embodiment of the present invention is explained above, the present invention is not to be limited to the aforementioned embodiment. In addition, the effects described in the present embodiment are merely listing the most preferred effects generating from the present invention, and the effects according to the present invention are not to be limited to those described in the present embodiment.

The control method according to the waveform display device 1 is realized by way of software. In the case of being realized by software, the programs constituting this software are installed into a computer (waveform display device 1).

In addition, these programs may be recorded on removable media and distributed to the user, or may be distributed by being downloaded to the user's computer via a network.

EXPLANATION OF REFERENCE NUMERALS

1 waveform display device
2 numerical control
3 external equipment
4 display device
11 data acquisition part
12 temporary storage part
13 condition determination part
14 data extraction part
15 data storage part
16 waveform display part

What is claimed is:

1. A waveform display device, comprising:
a data acquisition part that acquires a plurality of predetermined types of data from output data outputted from a numerical control, wherein the plurality of predetermined types of data include a program number of a processing program outputted from the numerical control, line number of a program, position command and operating state of the numerical control;
a condition determination part that determines a start condition and an end condition for extracting partial data from the plurality of predetermined types of data based on at least one among the program number of the processing program outputted from the numerical control, line number of the program, position command and operating state of the numerical control;
a data extraction part that extracts each partial data corresponding to the start condition and end condition from each of the plurality of predetermined types of data; and
a waveform display part that displays the partial data associates waveforms of each partial data with time, unifies and displays waveforms of each partial data.

2. The waveform display device according to claim 1, wherein the condition determination part determines the start condition and the end condition, based on input information from external equipment and information from the numerical control.

3. The waveform display device according to claim 2, wherein the input information is a time set in advance, and the condition determination part determines the start condition and the end condition based on the time set in advance and the information from the numerical control.

4. The waveform display device according to claim 2, wherein the condition determination part determines an elapse of a fixed time period since the start condition being established as the end condition.

5. The waveform display device according to claim 1, wherein the condition determination part determines an event of the position command of the processing program starting as the start condition, at a specific program number and specific program line number of the processing program outputted from the numerical control, and wherein the condition determination part determines the event of the position command ending as the end condition, at a specific program number and specific program line number of the processing program outputted from the numerical control.

* * * * *